(12) United States Patent
Cook

(10) Patent No.: US 8,488,237 B2
(45) Date of Patent: Jul. 16, 2013

(54) WIDE SPECTRAL COVERAGE ROSS CORRECTED CASSEGRAIN-LIKE TELESCOPE

(75) Inventor: Lacy G. Cook, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 43 days.

(21) Appl. No.: 13/004,994

(22) Filed: Jan. 12, 2011

(65) Prior Publication Data
US 2012/0176671 A1 Jul. 12, 2012

(51) Int. Cl.
*G02B 17/00* (2006.01)
(52) U.S. Cl.
USPC .......................................... 359/364; 359/350
(58) Field of Classification Search
None
See application file for complete search history.

(56) References Cited

U.S. PATENT DOCUMENTS

| | | | |
|---|---|---|---|
| 3,153,146 A | 10/1964 | Lady | |
| 3,218,390 A | 11/1965 | Bramley | |
| 3,524,698 A * | 8/1970 | Brueggemann | 359/729 |
| 5,114,238 A * | 5/1992 | Sigler | 359/399 |
| 5,118,945 A * | 6/1992 | Winschuh et al. | 250/341.4 |
| 7,236,297 B1 * | 6/2007 | Ackermann et al. | 359/365 |
| 7,933,067 B1 * | 4/2011 | Cook | 359/399 |
| 2008/0225409 A1 * | 9/2008 | Alexay | 359/718 |

FOREIGN PATENT DOCUMENTS

| | | | |
|---|---|---|---|
| CN | 101201450 A | * | 6/2008 |
| CN | 100580499 | | 1/2010 |

OTHER PUBLICATIONS

Ross, Frank E., "Lens Systems for Correcting Coma of Mirrors", Astrophysical J., vol. 81, pp. 156-172 (Mar. 1935).
Ritchey-Chretien telescope, Wikipedia, http://en.wikipedia.org/wiki/Ritchey%E2%80%93Chr%C3%A9tien_telescope, Mar. 30, 2003 (pp. 1-4).
Cassegrain Reflector, Wikipedia, http://en.wikipedia.org/wiki/Cassegrain_reflector, Jul. 1, 2005 (pp. 1-5).
Ritchey-Chretien telescope, Wikipedia, http://en.wikipedia.org/wiki/Ritchey%E2%80%93Chr%C3%A9tien_telescope, Mar. 30, 2003 (pp. 1-4).
Cassegrain Reflector, Wikipedia, http://en.wikipedia.orglwiki/Cassegrain_reflector, Jul. 1, 2005 (pp. 1-5).

* cited by examiner

*Primary Examiner* — Arnel C Lavarias
(74) *Attorney, Agent, or Firm* — Lando & Anastasi, LLP

(57) ABSTRACT

Various embodiments provide a Cassegrain-like telescope. The Cassegrain-like telescope includes a primary mirror; a secondary mirror spaced apart from the primary mirror, the primary mirror and the second mirror configured to form a focal surface; and an optical aberrations corrector having a plurality of lenses, the optical aberrations corrector being disposed between the secondary mirror and the focal surface, the optical aberration corrector being configured to correct optical aberrations of the primary mirror and the secondary mirror. A material of the plurality of lenses is selected to transmit radiation in a wavelength range between approximately 0.4 µm and approximately 12 µm, and is selected to have variations in refractive index below about 0.05 so as to reduce chromatic aberration to a level such that an average root mean square of wave front error (RMS WFE) is less than approximately 0.08.

19 Claims, 3 Drawing Sheets

WIDE SPECTRAL COVERAGE ROSS CORRECTED CASSEGRAIN-LIKE TELESCOPE

BACKGROUND

This disclosure pertains to a Ross corrected Cassegrain-like telescope operating in a wide range of wavelengths.

Cassegrain-like telescopes including the classic Cassegrain telescope, the Dall-Kirkham telescope, the Schmidt-Cassegrain telescope, the Maksutov-Cassegrain telescope, the Argunov-Cassegrain telescope, the Klevtsov-Cassegrain telescope, and the Ritchey-Chretien (RC) telescope are widely used for observation of objects in the visible wavelength range. Cassegrain-like two-mirror based telescopes are known to have a very limited field of view (FOV), limited by off-axis field curvature, as well as coma and astigmatism. The RC telescope is designed to eliminate coma and provide a larger field of view than the Cassegrain configuration. The classic Cassegrain telescope has a primary parabolic mirror and a secondary hyperbolic mirror. The RC telescope has a hyperbolic primary and a hyperbolic secondary mirror.

Correction of off-axis aberrations in a Cassegrain-like two-mirror telescope has been implemented using Ross or Wynne optical aberrations correctors. Ross and Wynne optical aberration correctors use a series of field lenses that are located near the final image formed by the Cassegrain-like two-mirror based telescope. However, conventional Ross or Wynne optical correctors exclusively used optical glass lenses and are operated in the visible wavelength range. Optical glass lenses have a limited range of wavelength operation and, in particular, are not suitable for a broader wavelength range, such as a wavelength range between about 0.4 µm and about 12 µm.

Therefore, there is a need in the art for a Cassegrain-like telescope, such as an RC telescope, that uses optical aberration correctors that can operate in the wavelength range between about 0.4 µm and about 12 µm which includes the short wavelength infrared (SWIR) range (between about 1.4 µm and about 3 µm), the mid-wavelength infrared (MWIR) range (between about 3 µm and about 8 µm) and at least a portion of the long-wavelength infrared (LWIR) range (between about 8 µm and about 15 µm) while providing an extended field of view (FOV) equal to or greater than about 1 deg.

SUMMARY

One or more embodiments of the present disclosure provide a Cassegrain-like telescope. The Cassegrain-like telescope includes a primary mirror; a secondary mirror spaced apart from the primary mirror, the primary mirror and the second mirror configured to form a focal surface; and an optical aberration corrector having a plurality of lenses, the optical aberrations corrector being disposed between the secondary mirror and the focal surface, the optical aberration corrector being configured to correct optical aberrations of the primary mirror and the secondary mirror. A material of the plurality of lenses is selected to transmit radiation in a wavelength range between approximately 0.4 µm and approximately 12 µm, and is selected to have variations in refractive index below about 0.05 so as to reduce chromatic aberration to a level such that an average root mean square of wave front error (RMS WFE) is less than approximately 0.08.

Another embodiment of the present disclosure provides a method of correcting aberrations of a Cassegrain-like telescope having a primary mirror and a secondary mirror spaced apart from the primary mirror. The method includes disposing an optical aberration corrector comprising a plurality of lenses between the secondary mirror and a focal surface formed by the primary mirror and the secondary mirror. The method further includes selecting a material of the plurality of optical lenses that transmit radiation in a wavelength range between approximately 0.4 µm and approximately 12 µm and having variations in refractive index less than about 0.05 in said wavelength range so as to correct optical aberrations of the primary mirror and the secondary mirror.

These and other features and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of this disclosure, the structural components illustrated herein are drawn to scale. It is to be expressly understood, however, that the drawings are for the purpose of illustration and description only and are not intended as a definition of the limits of the inventive concept. As used in the specification and in the claims, the singular form of "a", "an", and "the" include plural referents unless the context clearly dictates otherwise.

DETAILED DESCRIPTION

Figure 1:
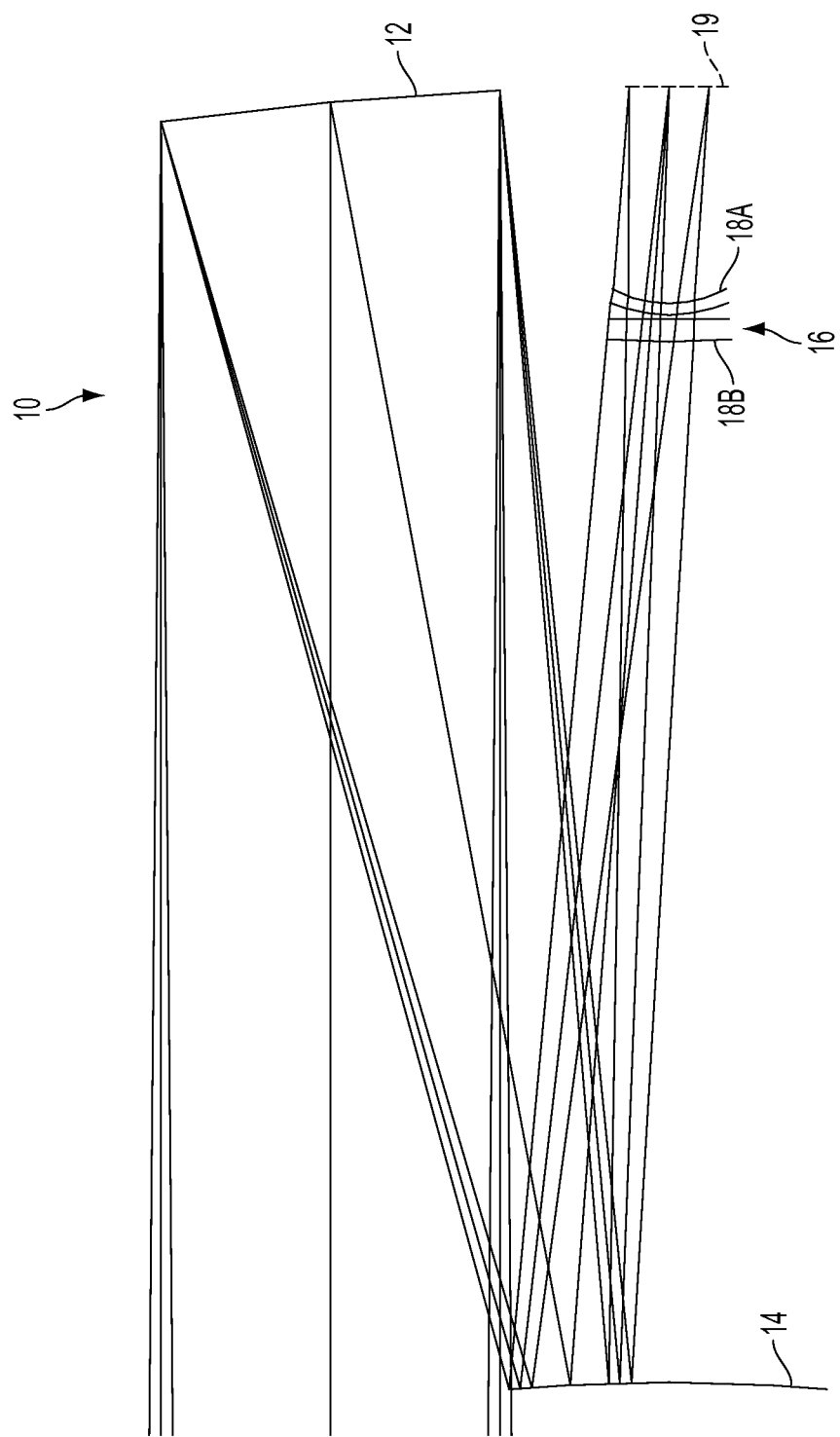
FIG. 1 shows a ray-tracing simulation in an RC telescope, according to one embodiment.

FIG. 1 shows a ray-tracing simulation in RC telescope 10, according to one embodiment. RC telescope 10 includes hyperboloid primary mirror 12, hyperboloid secondary mirror 14, and optical aberrations corrector 16. Optical aberrations corrector 16 comprises a plurality of optical lenses. Optical aberrations corrector 16 is used to correct for any optical aberrations including spherical aberrations, coma and astigmatism that may originate from two mirrors 12 and 14. For example, as shown in FIG. 1, optical aberrations corrector 16 comprises two optical lenses 18A and 18B. However, as it can be appreciated, two or more lenses can be provided in optical aberrations corrector 16 to correct for optical aberrations (e.g., spherical aberrations, coma, and astigmatism). Primary mirror 12 and secondary mirror 14 form focal surface 19. Optical lenses 18A and 18B are disposed between secondary mirror 14 and focal surface 19 of primary mirror 12 and secondary mirror 14. In one embodiment, optical lenses 18A and 18B are disposed near focal surface 19 formed by primary mirror 12 and secondary mirror 14.

In one embodiment, RC telescope 10 can operate as an imaging optical system, in which case radiation from a far-field object (not shown) is received by primary mirror 12. Primary mirror 12 reflects the radiation towards secondary mirror 14. Secondary mirror 14 is configured to receive the radiation reflected by primary mirror 12 and reflect the radiation to form an image at flat focal surface 19 after passing through optical aberrations corrector 16. In one embodiment, flat focal surface 19 may be configured to satisfy the zero Petzval curvature or "flat field" condition.

In another embodiment, RC telescope 10 can operate as a wide field of view (WFOV) collimator or a piece of optical special test equipment (OSTE). For example, in this case, RC telescope 10 can be used to simulate an object at far field for testing an imaging optical system or other telescopes. In this case, a radiation source (not shown) can be positioned at focal surface 19. Radiation from the radiation source is received by secondary mirror 14 after passing through optical aberrations corrector 16, i.e. after passing through optical lenses 18A and 18B. Secondary mirror 14 reflects the radiation towards the primary mirror 12. Primary mirror 12 is configured to receive the radiation reflected by secondary mirror 14 after passing through optical aberration corrector 16 and reflect the radiation to form a collimated beam at infinity. Hence, the collimated beam formed by telescope 10 simulates a radiation source at far field (tens of kilometers to thousands of kilometers away from the imaging optical system to be tested) while, in fact, the radiation source can be located at less than 1 meter away from the imaging optical system to be tested.

Figure 2:
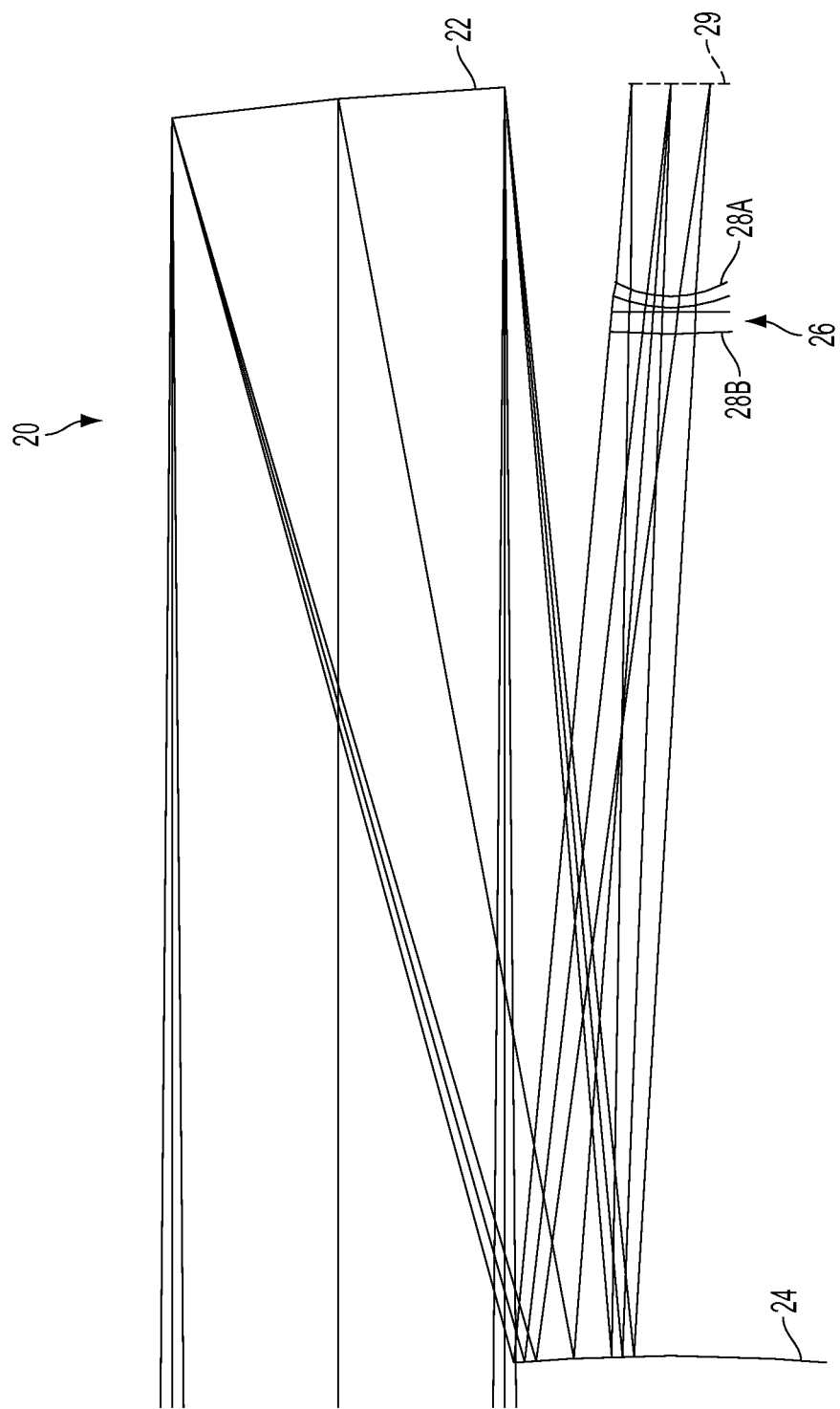
FIG. 2 shows a ray-tracing simulation in a Cassegrain-like telescope, according to another embodiment.

FIG. 2 shows a ray-tracing simulation in Cassegrain-like telescope 20, according to another embodiment. Cassegrain-like telescope 20 includes parabolic primary mirror 22, hyperbolic secondary mirror 24, and optical aberration corrector 26. Optical aberrations corrector 26 comprises a plurality of optical lenses. Optical aberrations correctors 26 is used to correct for any optical aberrations including spherical, coma and astigmatism that may originate from mirrors 22 and 24. For example, as shown in FIG. 2, optical lenses 28A and 28B are provided in optical aberration corrector 26. However, as it can be appreciated, two or more lenses can be provided in corrector 26 to correct for optical aberrations. Primary mirror 22 and secondary mirror 24 can form an image at focal surface 29. Optical lenses 28A and 28B are disposed between secondary mirror 24 and focal surface 29 of primary mirror 22 and secondary mirror 24. In one embodiment, optical lenses 28A and 28B are disposed near focal surface 29 formed by primary mirror 22 and secondary mirror 24.

Similar to RC telescope 10, Cassegrain-like telescope 20 can operate either as an imaging optical system to form an image at focal surface 29 or as a wide field of view (WFOV) collimator or a piece of optical special test equipment (OSTE) to simulate an object or a source of radiation at far field, as described above with respect to RC telescope 10.

Although two embodiments of Cassegrain-like telescopes (Cassegrain-like telescope 20 and RC telescope 10) are described herein, as it can be appreciated an optical aberrations corrector can be employed in any other Cassegrain-like telescope having at least two mirrors, including the Dall-Kirkham telescope, the Kutter telescope, the Schmidt-Cassegrain telescope, the Maksutov-Cassegrain telescope, the Argunov-Cassegrain telescope, and Klevtsov-Cassegrain telescope or any variation thereof.

The material of the plurality of lenses 18A and 18B, 28A and 28B in telescopes 10 and 20, respectively, is selected so as to transmit in a broad wavelength range, between about 0.4 µm and about 12 µm, and to extend the FOV of telescope 10, 20. In one embodiment, the material of plurality of lenses 18A, 18B, 28A and 28B may be selected from optical materials that transmit in the infrared region of the spectrum (e.g., SWIR and MWIR wavelength ranges), as well from optical materials having a desired refractive index to achieve an extended FOV of telescope 10, 20, for example, greater than 1.0 degrees.

Figure 3:
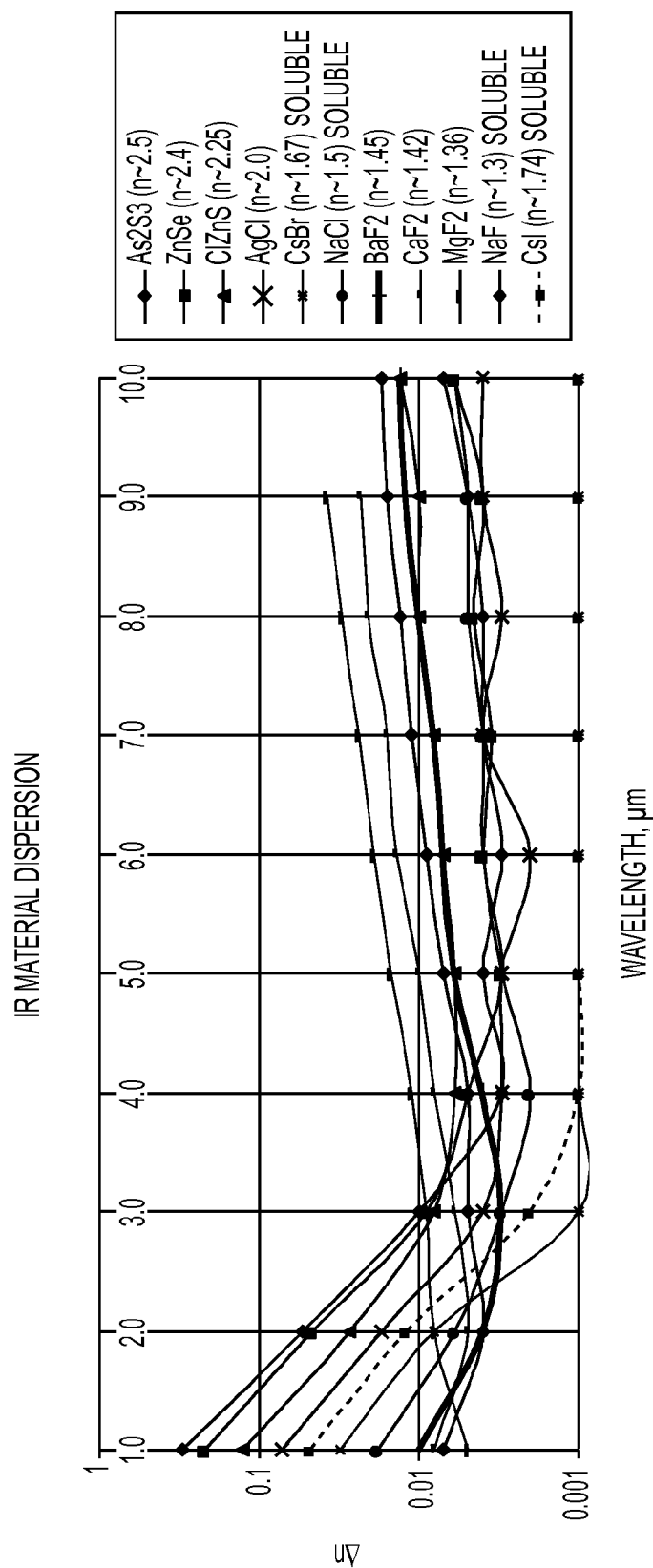
FIG. 3 is a plot of a variation in refractive index Δn as a function of wavelength in the range between about 1 µm and about 10 µm for various optical materials, according to one embodiment.

FIG. 3 is a plot of a variation in refractive index Δn as a function of wavelength in the range between about 1 µm and about 10 µm for various optical materials, according to one embodiment. In FIG. 3, various materials are listed that transmit in the wavelength range of interest. The materials that are highly soluble in water are indicated. Also indicated on this plot is the average approximate refractive index for each material. A variation in refractive index (which is related to Abbe number) provides information as to the optical dispersion properties of the material. The Abbe number is a measure of optical dispersion. The Abbe number is inversely proportional to the variation in refractive index Δn of a material. A material having a low optical dispersion has a higher value of Abbe number. Therefore, the greater the variation in index Δn, the lower is the Abbe number and thus the more the material is dispersive. The lower the variation in refractive index Δn, the higher is the Abbe number and thus the less the material is dispersive. Materials with a low dispersion provide a low chromatic aberration. As can be seen from the plot in FIG. 3, barium fluoride ($BaF_2$) has a relatively low variation in refractive index Δn (around 0.01) in the wavelength range of interest between about 1.0 µm and about 10.0 µm. Barium fluoride has a refractive index of about 1.45. Furthermore, as shown in FIG. 3, the refractive index variation Δn of $BaF_2$ is essentially constant in the wavelength range of interest between about 1.0 µm and about 10.0 µm. As shown in FIG. 3, NaF also has a relatively constant and low refractive index variation Δn around 0.01. However, NaF is soluble in water. Therefore, NaF is not as appropriate for fabricating an optical lens as is $BaF_2$.

A specific prescription for the embodiment illustrated in FIG. 1 is provided in Table 1.

TABLE 1

| SURF | Description | Rd | CC | Thickness | Tilt | Material |
| --- | --- | --- | --- | --- | --- | --- |
| 1 | Primary Mirror | −162.279 | −1.10656 | −57.6544 | n/a | Reflective |
| 2 | Secondary Mirror | −79.3477 | −7.30474 | 46.2851 | n/a | Reflective |
| 3 | Lens 1 | 31.4993 | n/a | 1.00 | n/a | BaF2 |
| 4 | Lens 1 | 185.35 | n/a | 0.2029 | n/a | air |
| 5 | Lens 2 | 6.7661 | n/a | 0.5 | n/a | BaF2 |
| 6 | Lens 2 | 5.2599 | n/a | 9.6658 | n/a | air |
| 7 | Focal Surface | ∞ | n/a | n/a | n/a | air |

In Table 1 are listed the various optical surfaces of telescope 10 and their respective radii of curvature (Rd), conic constants (CC), thickness, and type of material. For example, surfaces 3 and 4 correspond to first and second surface of lens 1 (lens 18B) in optical aberration corrector 16. Surfaces 5 and 6 correspond to first and second surface of lens 2 (lens 18A) in optical aberrations corrector 16. In this example, lenses 18A, 18B are made from $BaF_2$.

With this optical prescription, telescope 10 has an effective focal length of approximately 200 inches (about 5 m) and achieves a FOV of approximately 1.0 deg. The length of telescope 10 measured between primary mirror 12 and secondary mirror 14 is about 58 inches (about 1.47 m). Hence, telescope 10 has a telephoto ratio of about 3.44 (200 inches/58 inches). Telescope 10 has an entrance aperture of about 15 inches (about 38 cm) that is decentered in one direction (e.g., y-direction) by about 15 inches (38 cm). Telescope 10 achieves a used-speed of about F/13 with a speed of about F/4.5 for the parent optical system (i.e., the optical system that would use the full centered primary mirror aperture of 45 inches).

The average root mean square of the wave front error (RMS WFE) in the visible polychromatic wavelength range (between about 0.4 µm and about 0.8 µm) is about 0.025 over 0.5 deg. of FOV (the worst RMS WFE being about 0.03). The average RMS WFE in the visible polychromatic wavelength range (between about 0.4 µm and about 0.8 µm) is about 0.047 over 1.0 deg. of FOV (the RMS WFE being about 0.085 for worst edge). The average RMS WFE in the MWIR wavelength range (between about 3.0 µm and about 5.0 µm) is about 0.004 over 0.5 deg. of FOV (the worst RMS WFE being about 0.005). The average RMS WFE in the MWIR wavelength range (between about 3.0 µm and about 5.0 µm) is about 0.007 over 1.0 deg. of FOV (the RMS WFE being about 0.011 for worst edge). The above RMS WFE data shows that telescope 10 achieves reduced chromatic aberrations at the wavelength range of interest (for example, between about 0.4 µm and about 5.0 µm). Comparably or even lower RMS WFE values are also present in the LWIR portion of the spectrum from about 7.5 µm to about 10.0 µm. It is noted that the above image quality performance values are evaluated on a flat focal surface at a constant focus position, that is, there is no need to refocus the telescope for each spectral region of interest.

The embodiment shown in FIG. 1 and detailed in Table 1 has other characteristics worthy of note. The focal length of the primary-secondary mirror pair (i.e., primary mirror 12 and secondary mirror 14) alone is +199 inches, while the focal length of the lens pair (i.e., lenses 18A, 18B) alone is −209 inches. The focal length of the resulting system (i.e., primary mirror 12, secondary mirror 14, and lenses 18A and 18B) is +200 inches. The relatively long focal length of the lens pair together with its location near the final image accounts for the minor influence that the lens pair has in the value of the system focal length. For example, lens 18B has a focal length of +80 inches and lens 18A has a focal length of −56 inches, with the resulting focal length of the pair (lens 18A and lens 18B) being the above cited −209 inches. This combination of shorter more powerful positive and negative focal lengths for the individual lenses and the resulting longer less powerful combined focal length is a feature in field correctors of this Ross type. Also, since negative refractive power (of the lens pair) cancels the field curvature of negative reflective power of the mirror pair (i.e., primary mirror 12 and secondary mirror 14), a more flat focal surface can be achieved when the resultant focal length of the lens pair is negative, rather than zero or positive. In order to avoid the introduction of detrimental chromatic aberrations in the telescope design and also in order to limit the amount of (negative) optical power in the optical aberrations corrector 16, a low dispersion material is selected for the lenses 18A and 18B.

It should be appreciated that in one embodiment, the drawings herein are drawn to scale (e.g., in correct proportion). However, it should also be appreciated that other proportions of parts may be employed in other embodiments.

Although the inventive concept has been described in detail for the purpose of illustration based on various embodiments, it is to be understood that such detail is solely for that purpose and that the inventive concept is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

Furthermore, since numerous modifications and changes will readily occur to those with skill in the art, it is not desired to limit the inventive concept to the exact construction and operation described herein. Accordingly, all suitable modifications and equivalents should be considered as falling within the spirit and scope of the present disclosure.

What is claimed:

1. A Cassegrain-like telescope, comprising:
a primary mirror;
a secondary mirror spaced apart from the primary mirror, the primary mirror and the secondary mirror configured to form a focal surface; and
an optical aberrations corrector consisting of a plurality of lenses, the optical aberrations corrector being disposed between the secondary mirror and the focal surface, the optical aberrations corrector being configured to correct optical aberrations of the primary mirror and the secondary mirror,
wherein a material of the plurality of lenses is barium fluoride ($BaF_2$) selected to transmit radiation in a wavelength range between approximately 0.4 µm and approximately 12 µm, and having variations in refractive index below about 0.05 so as to reduce chromatic aberration to a level such that an average root mean square of wave front error (RMS WFE) is less than approximately 0.08.

2. The telescope of claim 1, wherein the optical aberrations include spherical aberrations, coma, or astigmatism, or any combination of two or more thereof.

3. The telescope of claim 1, wherein the wavelength range is between approximately 1.4 µm and approximately 3 µm.

4. The telescope of claim 1, wherein the wavelength range is between approximately 4 µm and approximately 8 µm.

5. The telescope of claim 1, wherein the wavelength range is between approximately 8 µm and approximately 12 µm.

6. The telescope of claim 1, where in the primary mirror and the secondary mirror are hyperboloid mirrors.

7. The telescope of claim 1, wherein the primary mirror is a parabolic mirror and the secondary mirror is a hyperbolic mirror.

8. The telescope of claim 1, wherein the telescope is configured to operate as an imaging optical system,
wherein the primary mirror is configured to receive radiation from a far field object and reflect the radiation towards the secondary mirror,
wherein the secondary mirror is configured to receive the radiation reflected by the primary mirror and reflect the radiation to form an image at the focal surface after passing through the optical aberrations corrector.

9. The telescope of claim 1, wherein the telescope is configured to operate as a collimator for optical testing,
wherein the secondary mirror is configured to receive radiation from a radiation source and reflect the radiation towards the primary mirror,
wherein the primary mirror is configured to receive the radiation reflected by the secondary mirror after passing through the optical aberrations corrector and reflect the radiation to form a collimated beam so as to simulate a radiation source disposed at infinity.

10. The telescope of claim 1, wherein an effective focal length of the telescope is approximately 200 inches and a length of the telescope is approximately 58 inches so as to achieve a telephoto ratio of approximately 3.44.

11. The telescope of claim 1, wherein a field of view of the telescope is equal to or greater than approximately 1 deg.

12. The telescope of claim 1, wherein a speed of the telescope is approximately F/13.

13. A method of correcting aberrations of a Cassegrain-like telescope having a primary mirror and a secondary mirror spaced apart from the primary mirror, the method comprising:
   disposing an optical aberrations corrector consisting of a plurality of lenses between the secondary mirror and a focal surface formed by the primary mirror and the secondary mirror, and
   selecting a material of the plurality of optical lenses to be barium fluoride ($BaF_2$) that transmits radiation in a wavelength range between approximately 0.4 μm and approximately 12 μm and having variations in reflective index less than about 0.05 in said wavelength range and configuring the plurality of optical lenses so as to correct optical aberrations of the primary mirror and the secondary mirror.

14. A Cassegrain-like telescope, comprising:
   a primary mirror;
   a secondary mirror spaced apart from the primary mirror, the primary mirror and the secondary mirror configured to form a focal surface; and
   an optical aberrations corrector consisting of a plurality of barium fluoride ($BaF_2$) lenses, the optical aberrations corrector being disposed between the secondary mirror and the focal surface, the optical aberrations corrector being configured to correct optical aberrations of the primary mirror and the secondary mirror.

15. The telescope of claim 14, wherein the optical aberrations include spherical aberrations, coma, or astigmatism, or any combination of two or more thereof.

16. The telescope of claim 14, where in the primary mirror and the secondary mirror are hyperboloid mirrors.

17. The telescope of claim 14, wherein the primary mirror is a parabolic mirror and the secondary mirror is a hyperbolic mirror.

18. The telescope of claim 14, wherein a field of view of the telescope is equal to or greater than approximately 1 degree.

19. The telescope of claim 14, wherein a speed of the telescope is approximately F/13.

* * * * *